United States Patent
Dawson et al.

(10) Patent No.: US 6,347,330 B1
(45) Date of Patent: Feb. 12, 2002

(54) DYNAMIC SELECTIVE DISTRIBUTION OF EVENTS TO SERVER RECEIVERS

(75) Inventors: Colin Scott Dawson; Michael Allen Kaczmarski; Bonnie Jean Vining; Robert Guy Vining; Donald Paul Warren, Jr., all of Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/146,960

(22) Filed: Sep. 4, 1998

(51) Int. Cl.[7] .................. G06F 15/16; G06F 15/177
(52) U.S. Cl. .................. 709/203; 709/223; 709/229
(58) Field of Search .................. 395/773, 600; 364/579; 702/188, 183; 709/224, 201, 203, 223, 225, 227, 219, 229; 707/3, 103; 705/26; 370/216, 458, 351

(56) References Cited

U.S. PATENT DOCUMENTS

| | | | |
|---|---|---|---|
| 4,595,980 A | 6/1986 | Innes | 364/200 |
| 5,355,484 A | 10/1994 | Record et al. | 395/650 |
| 5,530,868 A | 6/1996 | Record et al. | 395/700 |
| 5,566,337 A * | 10/1996 | Szymanski et al. | 395/773 |
| 5,592,664 A * | 1/1997 | Starkey | 395/600 |
| 5,608,908 A | 3/1997 | Barghouti et al. | 395/703 |
| 5,612,898 A | 3/1997 | Huckins | 364/514 R |
| 5,621,892 A | 4/1997 | Cook | 395/200.1 |
| 5,632,032 A | 5/1997 | Ault et al. | 395/670 |
| 5,634,016 A | 5/1997 | Steadham, Jr. et al. | 395/329 |
| 5,652,908 A * | 7/1997 | Douglas et al. | 395/800 |
| 5,655,081 A | 8/1997 | Bonnell et al. | 395/200.32 |
| 5,666,486 A | 9/1997 | Alfieri et al. | 395/200.47 |
| 5,717,614 A * | 2/1998 | Shah et al. | 364/579 |
| 5,781,737 A * | 7/1998 | Schmidt | 709/224 |
| 5,978,753 A * | 11/1999 | Eidson | 702/188 |
| 6,006,258 A * | 12/1999 | Kalajan | 709/219 |
| 6,026,413 A * | 2/2000 | Challenger et al. | 707/202 |
| 6,049,764 A * | 4/2000 | Stahl | 702/183 |
| 6,052,729 A * | 4/2000 | Robinson | 709/224 |

\* cited by examiner

Primary Examiner—Mark H. Rinehart
Assistant Examiner—Marc D. Thompson
(74) Attorney, Agent, or Firm—John H. Holcombe (57) ABSTRACT

Disclosed is a server having a plurality of clients coupled to the server at client nodes, and coupled to a plurality of receivers. Events, which may range from a successful completion message to a major error alert, may be generated relating to the server or to the client nodes. A method is disclosed for dynamically selectively distributing the events to particular ones of the receivers, in response to a selective enabling/disabling of the events to each receiver. The method with respect to client nodes comprises: upon opening a session of a client node, the selectively enabled events/receivers relating to the client node are determined. Upon the selective enabling/disabling occurring during the session of the client node, the determined selectively enabled events/receivers relating to the client node are dynamically updated. Then, upon occurrence of an event relating to a client node, the event is distributed to ones of the receivers having been selectively enabled for the event in the determining and the dynamically updating steps. Additionally, classes of events or wild card groups of client nodes may be enabled.

41 Claims, 4 Drawing Sheets

Class Vectors (51) — table 50, Severities

| Severity | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| SEVERE  | 0 | 0 | 0 | 0 | 0 | 0 | 0 | 0 | 0 | 0 | 0 | 0 | 1 | 0 | 0 | 0 | 0 | 0 | 0 | 0 |
| ERROR   | 0 | 1 | 1 | 0 | 0 | 1 | 0 | 0 | 1 | 1 | 0 | 1 | 0 | 0 | 1 | 0 | 0 | 0 | 1 | 0 |
| WARNING | 0 | 0 | 0 | 1 | 1 | 0 | 1 | 0 | 0 | 0 | 1 | 0 | 0 | 0 | 1 | 0 | 0 | 0 | 0 | 1 |
| INFO    | 1 | 0 | 0 | 0 | 0 | 0 | 0 | 1 | 0 | 0 | 0 | 0 | 1 | 0 | 0 | 0 | 1 | 1 | 0 | 0 |

EVENT OFFSETS (BITS)

FIG. 4

Event Vectors (55) — table 54, Receivers

| Receiver | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| USER EXIT | 0 | 0 | 0 | 0 | 0 | 0 | 0 | 0 | 0 | 0 | 0 | 0 | 0 | 0 | 0 | 0 | 0 | 0 | 0 | 0 |
| TIVOLI    | 0 | 1 | 1 | 0 | 0 | 1 | 0 | 0 | 1 | 1 | 0 | 1 | 0 | 1 | 1 | 0 | 0 | 0 | 1 | 0 |
| NETVIEW   | 0 | 0 | 0 | 0 | 0 | 0 | 0 | 0 | 0 | 0 | 0 | 0 | 0 | 0 | 0 | 0 | 0 | 0 | 0 | 0 |
| SNMP      | 0 | 0 | 0 | 0 | 0 | 0 | 0 | 0 | 0 | 0 | 0 | 0 | 0 | 0 | 0 | 0 | 0 | 0 | 0 | 0 |
| FILE      | 0 | 0 | 0 | 0 | 0 | 0 | 0 | 0 | 0 | 0 | 0 | 0 | 0 | 0 | 0 | 0 | 0 | 0 | 0 | 0 |
| ACTLOG    | 1 | 1 | 1 | 1 | 1 | 1 | 1 | 1 | 1 | 1 | 1 | 1 | 1 | 1 | 1 | 1 | 1 | 1 | 1 | 1 |
| CONSOLE   | 1 | 1 | 1 | 0 | 1 | 1 | 0 | 1 | 1 | 0 | 1 | 1 | 1 | 1 | 1 | 1 | 1 | 1 | 1 | 1 |

EVENT OFFSETS (BITS)

FIG. 5

Table 60 (61)

| | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| USER EXIT | 0 | 0 | 0 | 0 | 0 | 0 | 0 | 1 | 0 | 0 | 1 | 0 | 0 | 0 | 1 | 0 | 0 | 0 | 0 | 0 |
| TIVOLI    | 1 | 0 | 1 | 0 | 1 | 0 | 1 | 0 | 1 | 1 | 1 | 0 | 0 | 1 | 0 | 1 | 1 | 0 | 0 | 0 |
| NETVIEW   | 0 | 0 | 0 | 0 | 0 | 0 | 0 | 0 | 0 | 0 | 0 | 0 | 0 | 0 | 0 | 0 | 0 | 0 | 0 | 0 |
| SNMP      | 0 | 0 | 0 | 0 | 0 | 0 | 0 | 0 | 0 | 0 | 0 | 0 | 0 | 0 | 0 | 0 | 0 | 0 | 0 | 0 |
| FILE      | 1 | 0 | 0 | 0 | 0 | 0 | 1 | 0 | 0 | 0 | 1 | 1 | 0 | 0 | 1 | 0 | 0 | 0 | 0 | 1 |
| ACTLOG    | 1 | 1 | 1 | 1 | 1 | 1 | 1 | 1 | 1 | 1 | 1 | 1 | 1 | 0 | 1 | 1 | 1 | 1 | 1 | 1 |
| CONSOLE   | 1 | 1 | 1 | 1 | 1 | 1 | 1 | 1 | 1 | 1 | 1 | 1 | 1 | 0 | 1 | 1 | 1 | 1 | 1 | 1 |

DYNAMIC SELECTIVE DISTRIBUTION OF EVENTS TO SERVER RECEIVERS

TECHNICAL FIELD

This invention relates to servers comprising computer processor systems, such as in a distributed or network systems environment, and, more particularly, to the management of the server and the distribution of events occurring with respect to the server.

BACKGROUND OF THE INVENTION

The distributed or network environment of computer processor systems typically comprises a large number of individual nodes, such as workstations, PC's, terminals, host computers, and data storage components, which are tied together across a network. Also typically, the distributed or network systems comprise remotely located clients tied together to utilize common data storage components. The management of the data for efficient storage and retrieval is a critical element of the operation of the network.

One type of network is that employed to provide a backup and archive storage system for remotely located clients. Backup protects the client system data from a system failure or disk crash. The data is typically first moved to disk drives and then migrated to tape as the need for access to the data becomes less immediate. Archive storage is data that won't usually have a copy in the originating client system. It is archived so that the data may be made available if it is ever needed, for example, for legal requirements. Data is typically archived on tape.

Before the advent of modern data management systems, the client kept the only log of events related to the backup or archived data, and that log was only viewable from the client workstation. Should some kind of error situation arise, there was no visibility of the error to the data storage system administrators because the error log was also only on the client machine.

Another major function of the network storage server is space management. The data storage capacity of the client system is limited, and the network storage server may migrate the client user's live data to a server to free up space on the client system until a particular file is needed. At that point, the file is recalled from the server back to the client system.

One system designed to store and manage data for remotely located clients is called the ADSTAR Distributed Storage Manager (ADSM) of IBM. In ADSM, a central server is coupled to multiple client platforms and one or more administrators. The server provides archival, backup, retrieval, and other management functions for the server's clients. Should an error situation arise, that message may be provided to the server system administrator as an "event" or an "alert". In server system parlance, an "event" is any message relating to the server system, including those messages, called "alerts", which require attention.

The number of networked clients is high and the mix of clients tends to change often. Additionally, the clients tend to have wide varieties of application programs with differing data storage needs. Thus, the server needs to have flexibility to allow changes to be made within the system without disrupting the operation of the system. U.S. Pat. No. 5,621,892, Cook, addresses this problem by having registration procedures for the registration of devices and of expected alerts and configures a map between registered alerts and registered service providers for the distribution of events when they occur. The registration and mapping occurs at a standard initial set up for the system.

With the number of client nodes now sometimes reaching 1,000 or higher, and a map of 1,000 events with respect to several receivers for a single client consuming over 1,000 bytes of memory, the total logging map would consume over 1,000,000 bytes of memory alone. It would be helpful if the memory usage could be reduced.

The high number of client nodes prevents the administrator from monitoring all of the clients individually. Thus, in the system of Cook, all the registered alerts of particular types are sent to particular receivers as selected at the registration, and not all events are sent to the administrator. However, the administrator would prefer to select and tailor the events that are to be monitored, and tailor the logging and display of the selected events at various receivers, such as a server console, an activity log, a SNMP management program, or an enterprise system management application, such as Tivoli Enterprise Console (TEC). Additionally, the administrator would prefer not to wait until an initialization of the server to update the system logging.

Further, a limitation on the prior art is the inability to easily specifically map and remap each individual client node into the system logging map, so as to distribute only the desired specific types of events or from specific types of client nodes to specific receivers.

SUMMARY OF THE INVENTION

It is an object of the present invention to allow specific tailoring of the distribution of events by the administrator, and to allow updating of the mapping of the distribution of events to client nodes during operation of the distributed network system, without waiting for an initialization.

It is another object of the present invention to provide distribution of events while allowing efficient use of the server memory.

It is still another object of the present invention to allow ease of distributing specific types of events to specific receivers, or specific events for groups of client nodes to specific receivers.

Disclosed is a server having a plurality of clients coupled to the server at client nodes, and coupled to a plurality of receivers. Events, which may range from a successful completion message to a major error alert, may be generated relating to the client nodes. A method is disclosed for dynamically selectively distributing the client node events to particular ones of the receivers, in response to commands selectively enabling/disabling the client events to each receiver, while maintaining only the presently needed mapping in the server memory. The method comprises: upon opening a session of a client node, the selectively enabled events/receivers relating to the client node are determined from a database and placed in a client vector, preferably in memory. Upon the selective enabling/disabling occurring during the session of the client node, the determined selectively enabled events/receivers relating to the client node are dynamically updated, both in the database and, as needed, in the client vectors. Then, upon occurrence of an event relating to a client node, the event is distributed to ones of the receivers having been selectively enabled for the event in the determining and the dynamically updating steps. The client vectors may comprise two dimensional bit vectors identifying the enabled/disabled events/receivers for the client nodes.

Thus, the distribution of events may be continually updated during the operation of the server and the network system.

Additionally, the distribution rules are stored in a database, for example, on one or more disk drives, and only the distribution for the connected client nodes are stored in the client vector in the server memory.

In another aspect of the present invention, the step of storing rules in the database additionally comprises storing class vectors for selectively enabling classes of events to ones of the receivers. The determining step additionally comprises reading the database class vectors for selectively enabling/disabling the events for the receivers. Thus, the administrator may command distribution of classes of events, such as major errors, without identifying each of the events.

In still another aspect of the present invention, wild cards are used to collectively enable/disable client events for groups of clients to ones of the receivers. The determining and the updating steps thereupon additionally enable/disable the client events for the connected client nodes that are in the selected groups of clients. Thus, the administrator may command distribution of events relating to specific client nodes, such as major host systems to ones of the receivers.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
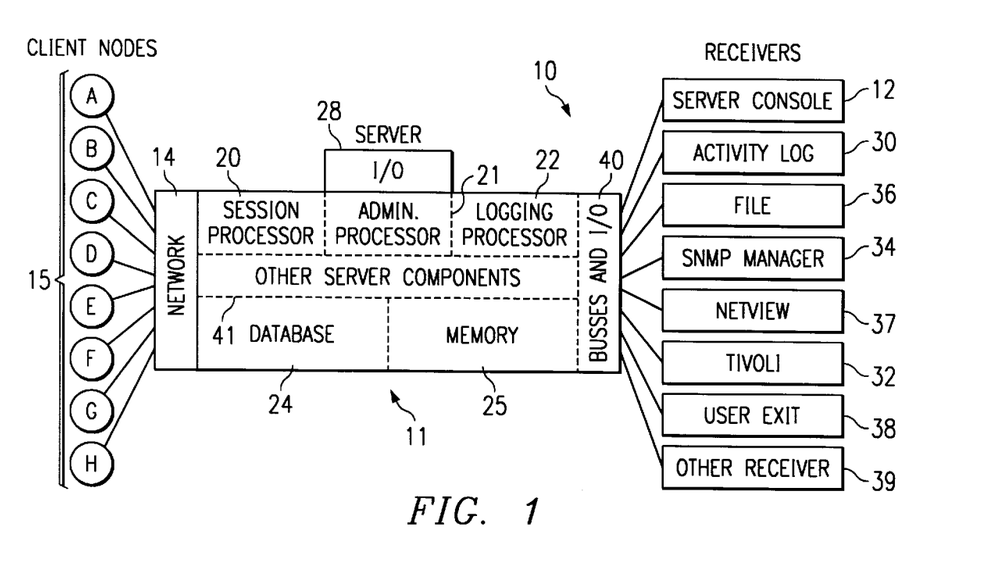
FIG. 1 is a block diagrammatic representation of a server of the present invention with coupled client nodes and receivers.
Figure 2:
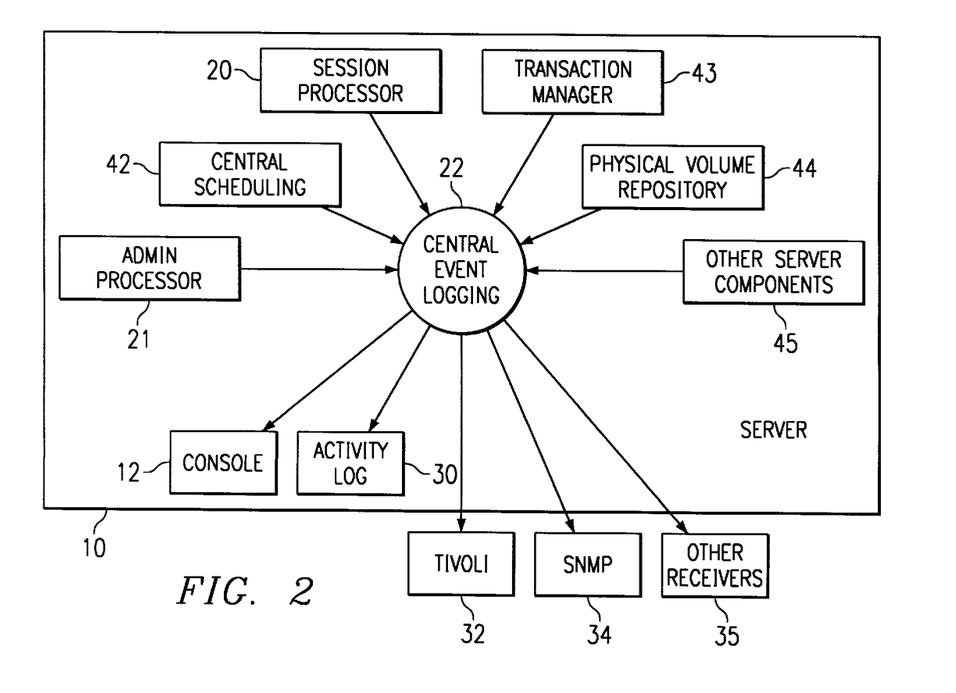
FIG. 2 is a diagrammatic representation of the server subsystem of FIG. 1.

Referring to FIGS. 1 and 2, server 10 (often called a server subsystem) may comprise a network server, a data storage server, other type of server, or a combination. The hardware employed for the server 10 may comprise one or more general purpose computers 11, such as an IBM RS/6000, and attached devices such as a server console 12. The server is connected over a network 14 to a number of clients at client nodes 15. An example of a server subsystem 10 is called the ADSTAR Distributed Storage Manager (ADSM) of IBM, which is designed to store and manage data for remotely located clients. The server provides archival, backup, retrieval, and other storage management functions for the server's clients.

The operation of the subsystem is accomplished through a number of software components, including, for example, a session processor 20, an administrative processor 21, and a logging processor 22. The software components employ at least one database 24, which may comprise one or more hard disk drives, and the computer memory 25. The software may be supplied with the computer 11 configured as a complete subsystem or may be added at I/O 28.

The server 10 is managed by an administrator, for example, at the server console 12. Typically, the administrator employs a graphical user interface (GUI) or a command line to enter commands for managing the server system.

The session processor 20 manages all the "sessions" between the clients 15 and server 10. A "session" establishes a current connection between the client and the server and is characterized by a client (that has been registered with the server) logging on to the server. The administration processor 21 handles the commands from the administrator(s), for example at the server console 12.

Typically, the server 10 communicates with the users and its administrator by means of "events" or messages. As described above, with a large number of client nodes 15, the administrator likely prefers to view and consider only certain events exchanged by the server 10 with the clients and internally.

A data storage server, such as ADSM, must organize and track data stored by the subsystem, and must protect that data. Many of the events are therefore highly important to the administrator with respect to the operating state of the server system, many are needed to record activities of the server and to backup the server, and many are needed from an enterprise overview perspective. Hence, various "receivers" are typically provided to receive certain of the events. Still referring to FIGS. 1 and 2, examples of receivers which are part of the server subsystem include the server console 12, and an activity log 30, which may comprise part of the ADSM database also stored on a disk file for the computer processor 11. The activity log stores events and allows them to be queried later, for example, by querying the activity of a particular node, or a particular time period.

Examples of external receivers may include an Enterprise Application Manager 32, such as the Tivoli Enterprise Console, and an "alert" manager 34, such as a conventional Simple Network Management Protocol (SNMP) manager. "Alerts" are the more significant messages that may require urgent attention. Other external receivers depicted as receivers 35 in FIG. 2 include, for example, an external file 36, a "Netview" manager 37, a user exit 38 and "other receiver" 39, depicted in FIG. 1. The user exit 38 may comprise a user's own program which will provide a message at the user's administration console, or send an E-mail message to the user, or operate a pager of the user's administrator. The receivers are coupled to the server processor 11 by means of busses and I/O 40, and the communication of the events is under the control of the logging processor 22. Each receiver has therefore started a thread which continues to run, and passes along events based on current rules until the server terminates it.

Other server components depicted as components 41 in FIG. 1 include, for example, central scheduling 42, transaction manager 43, physical volume repository 44, and other server components 45, depicted in FIG. 2. The central scheduling component 42 manages clients' schedules, that is, coordinating the timing for both client and server processes. The transaction manager 43 allows grouping of transactions for later rollback or commit, e.g., back up batching of files to the data storage managed by the server runs out of space and the transaction manager rolls back the transaction (cancel and do later). Commit is when the job completes successfully and comprises doing all the updates to the server database. The physical volume repository (PVR) 44 is a layer that manages the drives of the data storage managed by the server, and provides high level I/O code that is platform specific for the drives, one level up from the device drivers. The other server components 45 comprise components employed for other aspects of the server 10. Other types of network or distributed system servers may have some added or different specific components.

The interaction between each client node 15 and the server 10 results in the occurrence of large numbers of events. Before describing the operation of the present invention, a few of the numerous types of events will be discussed:

a) "Command Completed" is informational—lets the initiator know that the requested command has completed successfully.

b) "Database Initiation Failed" is an error indication—for example, because "Sufficient Memory is Not Available". The server administrator may wish to see this event so that the backup or archive storage may be allocated differently. The event may be stored in the activity log. The enterprise manager may wish to note the event.

c) "Session No. X Started for Node Y (client)" is informational. The administrator may want to see this event on the console, but the enterprise manager may not.

d) "Session No. X for Node Y Refused", for example because an "Invalid Password Submitted", is a warning, which the enterprise manager may want to know, for example, to track whether it is repeated without being cured.

e) "Disk Volume X Varied On Line" or "Disk Volume X Varied Off Line" are informational indicating that the disk is put online or is taken offline in the server and may be important to the administrator as well as to users whose data is involved.

f) "Insufficient No. of Mount Points Available in Device Class X", meaning that in a tape or optical library that not as many drives as defined are in fact available, is an error.

The administrator and requesting user may need to know this information, as may the enterprise manager.

g) "Inconsistency Found In LVM (Logical Volume Manager) Data Page—Partial Write Detected" would be a severe error situation of importance to the administrator, user, etc.

h) "Early Product Version Expired—Server Halting" is also a severe error situation, for example, occurring with a prototype which was expected to be updated to a production version. The situation would be of most importance to the administrator and the enterprise manager.

The above examples are called "server" events because they comprise messages originating in the server 10, most of which relate only to the interaction of the server components. Other events may originate in the client and are called "client" events. Although many client events result from the interaction of the server and the client, only a few are transmitted to the server, so that the network 14 bandwidth is not wasted on messages that are not of interest to the administrator. An example of a message not transmitted to the server, and therefore not an "event", is that "File XYZ was backed up successfully". An example of an "event" which is transmitted to the server is "Access Denied (e.g., no authority)", a warning. The administrator may have an interest if it is a continuing problem.

Figure 3:
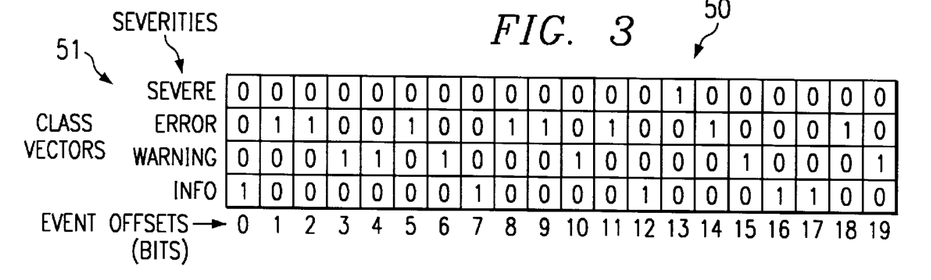
FIG. 3 is a representation of class vectors employed with the server of FIGS. 1 and 2.

It would be advantageous for the administrator to select easily between the various classes of events rather than to consider each event individually. Thus, in accordance with the present invention, as illustrated in FIG. 3, an embodiment of a two dimensional class vector 50, comprising a series of class bit vectors, which may be "0" or "1", is shown which identify the severity class for each of a number of events. Four severity classes 51 are shown, and are the same as discussed above, including "severe", "error", "warning" and "information". As a specific embodiment, the classes may be designated, respectively, as "S", "E", "W" and "I". The vector 50 is located in server memory 25 and is loaded from the database 24 or from the I/O 28 at initialization, presetting the classes. As an example, ADSM may allow 1,000 client events and 10,000 server events, and all may be included in table 50, only 20 of which are shown in FIG. 3. The class vectors do not change unless maintenance is applied to the server, either adding new events or changing severities.

In accordance with the present invention, the administrator may select an entire class of events for display at the console 12 or for logging in an activity log 30, etc., without individually providing an event distribution instruction for each of the thousands of events. Further, space is saved by having only a small class map 50 of events, rather than a map of each event and each client. Additionally, in accordance with the present invention, as clients are logged on to the server 10, their events become active, and are included in the class vector table 50 without requiring a special initialization. Additionally, the class designation commands are stored in the database 24, so that if future clients are registered with the server system, their events of the designated class are included without special initialization.

Figure 4:
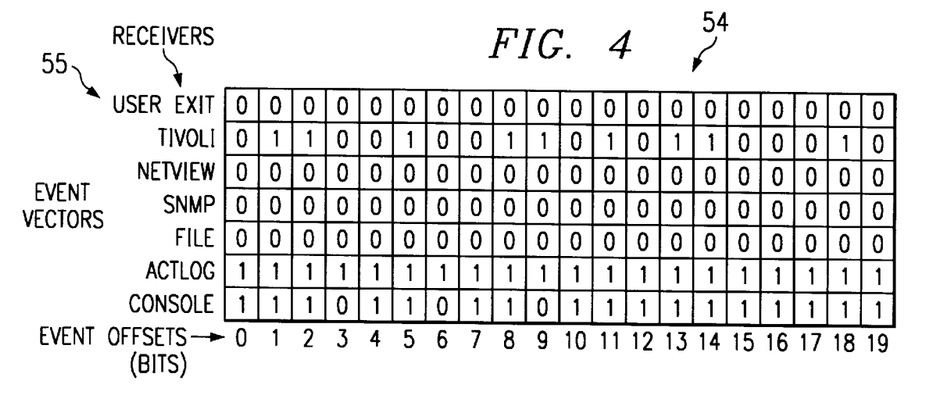
FIG. 4 is a representation of event vectors that may be employed in the server of FIGS. 1 and 2.

FIG. 4 is an embodiment of a two dimensional event bit vector 54, in accordance with the present invention, representing event/receiver vectors of the server 10 of FIGS. 1 and 2, and may be duplicated in a two dimensional client vector for each of the client nodes. Thus, a client event bit vector identifies each event relating to the respective client, and the server bit vectors 50 identify all server events. In accordance with the present invention, the event vector 54 comprises a "1" bit for each of the receivers 55 to which the event is to be distributed, and a "0" bit for each receiver 55 where the event will not be distributed.

Hereinafter, the term "events/receivers" has the same meaning as "one to many events mapped to one to many receivers", where the phrase "one to many" is the accepted term of those of skill in the art to mean "one or more".

The event vector 54 may, in accordance with the present invention, be updated by the administrator without stopping and reinitializing the server. The initial server table from which the vector 54 is derived will have been stored in the database 24 together with specific commands, and the vector brought into memory. In the example illustrated by the bits in vector 54, all events are initially enabled by default for the console 12 and the activity log 30 of FIGS. 1 and 2, and disabled for all other receivers. Combining the vector 50 of FIG. 3 with vector 54, it can be seen that all events that are classified as severe and error have been enabled for "Tivoli" receiver 32. It can also be seen that events 3, 6, and 9 have been independently disabled for the console 12. Thus, the administrator may selectively enable or disable any event or class of events. The updated rules are stored in the database 24.

An embodiment of a specific two dimensional client event vector 60 is illustrated in FIG. 5, again only illustrating an exemplary 20 of the thousands of possible events. In accordance with the present invention, in order to save memory, while allowing maximum flexibility, the client event vectors are generated only when the associated client node is active and logged on to the server. Since very large numbers of clients may be associated with the server, it is likely that only a percentage, sometimes small, of the clients are logged on at any one time.

As with respect to the server event vectors, the client event vector 60 represents event/receiver vectors that identify each event relating to the respective client. The client event vector 60 is provided in server memory 25. In accordance with the present invention, the event vector 60 comprises a two dimensional set of bit vectors built specifically for that client, having a "1" bit for each of the receivers 61 to which the event is to be distributed, and a "0" bit for each of the receivers 61 where the event will not be distributed. Upon a client logging on to the server, the client event vector 60 is generated by session processor 20 of FIGS. 1 and 2 from the table in database 24 based on a set of rules, which may include the client event vector 54 of FIG. 4, ORed with the class vector 50 of FIG. 3, together with commands which identify the specific client node. Thus, in the example of vector 60 in FIG. 5, the user exit has been enabled for events 7, 10, and 14 in accordance with specific commands. If the client event vector has been updated after initialization, or if new commands (rules) added that relate to the specific client, those updates will be reflected in the vector 60 based on updates stored in the database 24.

In accordance with the present invention, should the administrator wish to alter the distribution of any event or events which include the specific client, both the vector 60 and the stored rules will be updated by the administrative processor 21 of FIGS. 1 and 2.

Figure 5:
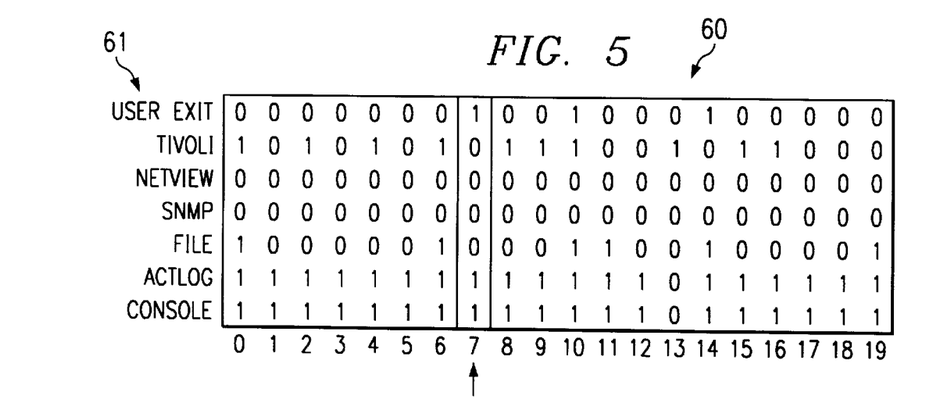
FIG. 5 is a representation of a client vector that may be employed in the server of FIGS. 1 and 2 when a client is logged on to the server system.
Figure 6:
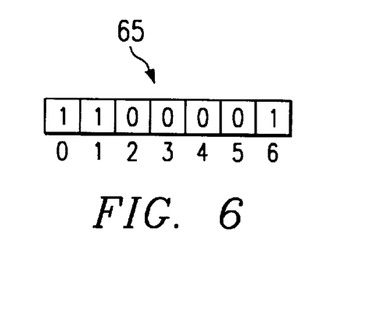
FIG. 6 is a representation of a receiver list derived from the client vector table of FIG. 5 as employed in the server of FIGS. 1 and 2.

FIG. 6 illustrates a single dimension receiver list bit vector 65 generated from the table 60 in FIG. 5. As the specific example, the bit vector 65 is event "7" from table 60. This vector is passed, together with the event, to logging processor 22 in FIGS. 1 and 2 for distribution. From this vector, and referring to the names of the receivers 61 in the table 60, the logging processor will distribute the event to the console 12, the activity log 30, and the user exit 38. The logging processor puts the event on the queue for each of the receivers, and the threads for the receivers each handle the event with the respective processes.

Thus, in accordance with the present invention, and referring to FIGS. 1–6, client node events are dynamically selectively distributed to particular ones of the receivers, in response to commands selectively enabling/disabling the client events to each receiver, while maintaining only the presently needed mapping in the server memory 25. Upon opening a session of a client node 15, the previously selectively enabled events/receivers relating to the client node are determined by session processor 20 from the class and event vectors of the server and placed in the client vector 60 in memory 25. Upon selective enabling/disabling occurring of an event/receiver during the session of the client node, the vector of determined selectively enabled events/receivers relating to the client node is dynamically updated by administrative processor 21, both in the vectors in the database 24 and in the client vector 60. Then, upon occurrence of an event relating to a client node, the event is distributed by logging processor 22 to ones of the receivers having been selectively enabled for the event in the determining and the dynamically updating steps. The event bit vector thus identifies the updated enabled/disabled events/receivers relating to the client nodes.

The commands by the administrator updating the rules and vectors, may be specific to a node, may be specific to a severity class, or, in accordance with the invention, may be wild cards. Wild cards are commands employing special characters to identify groups of client nodes, such as "*", and are employed to collectively enable/disable client events relating to groups of clients to ones of the receivers. An example is "DD*", which relates to all nodes beginning with "DD". The determining and the updating steps thereupon additionally enable/disable the client events for the connected client nodes that are in the selected groups of clients. Thus, the administrator may command distribution of events relating to specific types or groups of client nodes, such as major host systems, to ones of the receivers. A special wild card is "ALL" which applies the command to all receivers and events.

Also, in accordance with the present invention, by updating the rules in database 24, any future instances encompassed by the wild card are also included. Thus, in the case of a wild card that applies to major host systems, the addition of another major host system as a client node 15, includes the added major host system in the event distribution indicated by the wild card.

Examples of administrator commands include:

a) "enable event snmp all node=jo*" is a wild card command enabling an event to the SNMP manager receiver 34 for all nodes which begin with "jo";

b) "enable event tivoli severe" is a class command enabling severe events to the Tivoli receiver 32; and c) "enable event console ANR4234 node=DD043" is a specific command enabling event no. ANR4234 at node DD043 to the console 12.

The bit vector tables of FIGS. 3, 4 and 5 are each generated by associated rules tables in the database 24. As an example, the client table rules include the following fields:

DATE/TIME
UNIQUE KEY
NODE NAME

RECEIVER
EVENT
OPERATION

The server table is very similar except that there is no node name field.

Each delimited field of the commands goes in a separate row of the database, except that wild cards are not expanded in the table. They get expanded at the time the rules are applied to generate the bit vectors.

The date/time and unique keys, above, are used to ensure that rules are applied in the same order in which they were entered by the administrator. In this manner, whenever a new rule is added via issuance of an enable/disable command, a separate thread is initiated to delete any existing rules that are rendered redundant by the new rule. For example, if the administrator issues "enable event console all", any previous enables or disables for the console would be eliminated from the server rules table.

Figure 14:
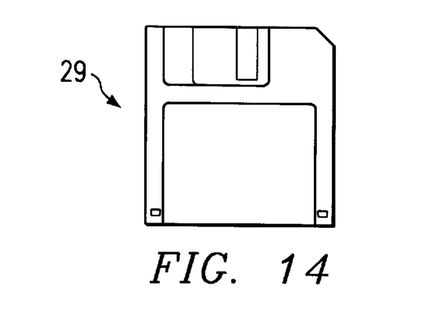
FIG. 14 is an illustration of a storage medium for storing computer readable program code.

The method of the present invention is preferably implemented by means of computer readable program code which causes a computer processor 11, to perform the desired steps. Referring to FIG. 14, the computer readable program code may be provided in the form of an article of manufacture 29 comprising a computer readable medium having the computer readable program code embodied therein. Examples of such articles of manufacture include floppy disks, optical disks (e.g., CDROMs), or magnetic tape, read at I/O 28 in FIG. 1. The computer readable program code may also be delivered to the server 10 in the form of a communication transmission received from the network via a client node 15 or at I/O 28 and stored in a disk drive.

The program code causes the computer to operate as specialized "processors" which utilize components of the computer to perform the programmed functions. In the embodiment illustrated in FIGS. 1–6, these processors include, for example, administrative processor 21, session processor 20, and logging processor 22. The computer processor 11 of the server 10 may alternatively be operated in differing manners as different sets of "processors" or singly, without departing from the scope of the present invention.

Figure 7:
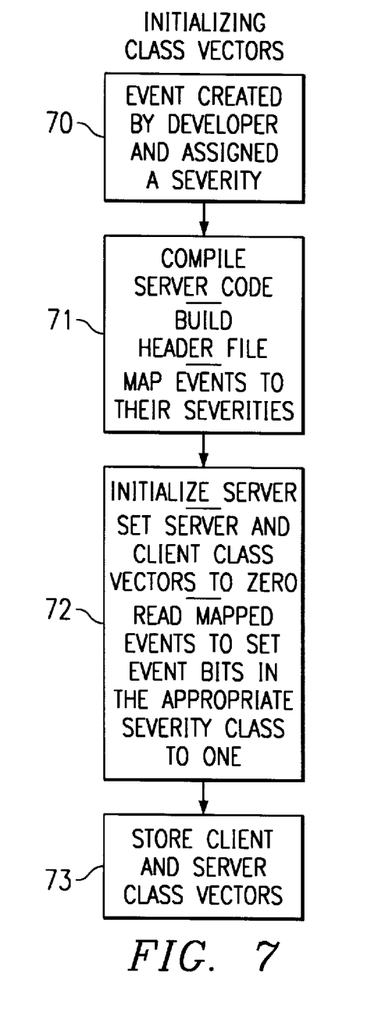
FIG. 7 is a flow chart representing an embodiment of the process of initializing class vectors employed with the server of FIGS. 1 and 2.

FIG. 7 is a flow chart representing an embodiment of the process of initializing the class vectors 50 of FIG. 3 employed with the server of FIGS. 1 and 2. Step 70 is conducted separately in advance by a developer who creates an event that is desired, and assigns it a severity. In step 71, the server code is compiled which builds a header file and maps events to their severities. Step 72 comprises initializing the server 10 of FIG. 1, setting the server and client class vectors to zero to form a base from which the specific settings may be made. This assures that only one class vector will be provided for each event. The mapped events are read by the administrative processor 21 to set the event bits in table 50 of FIG. 3 of the appropriate severity class to "1". In step 73, the client and server class vectors are then stored in the memory 25 and in the database 24. Subsequently, as will be explained, the class vectors are utilized for client event vector generation.

Figure 8:
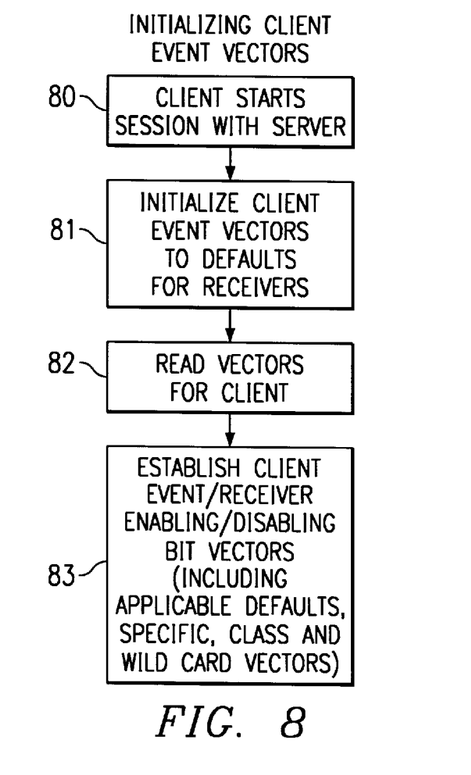
FIG. 8 is a flow chart representing an embodiment of the process of initializing client vectors employed with the server of FIGS. 1 and 2.

FIG. 8 is a flow chart representing an embodiment of the process of initializing client vectors, such as illustrated in table 60 of FIG. 5. In step 80, the client 15 starts the session with the server, such as by logging on to the server 10. In step 81, the session processor 20 initializes the client event vectors to defaults for receivers and, in step 82, reads all vectors that apply to the client node. In step 83, the session processor applies the vectors, e.g., by combining the server vectors, the class vectors, any client-specific rules commands, including any wild cards, to establish the table, and the client event vector 60, which enable/disable event/receiver bit vectors for the particular client node. The client event two dimensional vector is thus up to date just by logging on without requiring reregistration.

Figure 9:
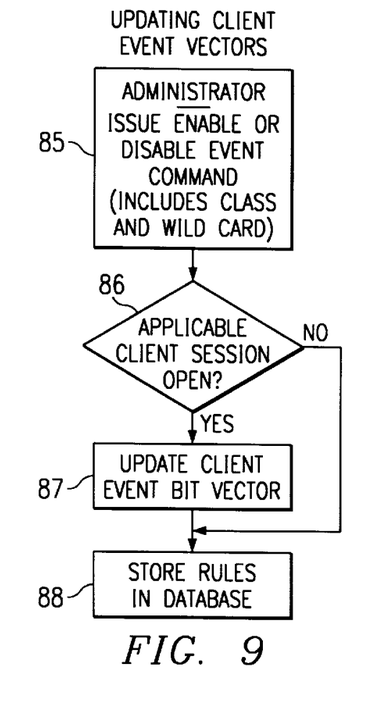
FIG. 9 is a flow chart representing an embodiment of the process of updating client vectors employed with the server of FIGS. 1 and 2.

FIG. 9 is a flow chart representing an embodiment of the process of updating client event vectors while the client is logged on. In step 85, the administrator issues an enable or disable event command. The command may comprise a specific client event command, a class command, or a wild card. Administrative processor 21 determines from the session processor, in step 86, whether the applicable client is logged on to the server 10. If the client is logged on, the administrative processor dynamically updates the client table event bit vector (vector 60 of FIG. 5) in step 87, and, in step 88, stores the new rule in the database 24. If, in step 86, it was determined that the client was not logged on, the table 60 for the client does not exist, and only step 88 is performed, storing the new rule in the database and updating the appropriate server or class vector in memory 25 as necessary.

Figure 10:
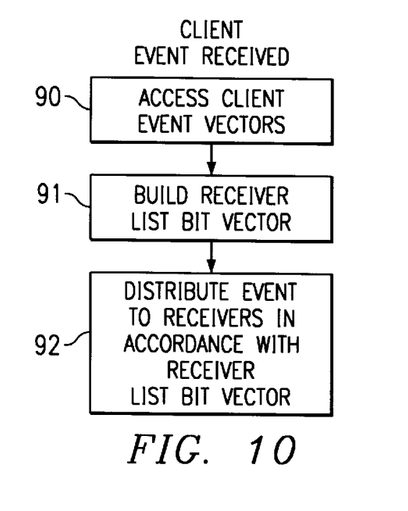
FIG. 10 is a flow chart representing an embodiment of the process of handling a client event employed with the server of FIGS. 1 and 2.

The occurrence of an event that relates to a client node is illustrated in FIG. 10. In step 90, the client table, such as vector table 60 in FIG. 5, is accessed, and, in step 91, the event vector of table 60 is accessed to form the receiver list bit vector 65 in FIG. 6. In step 92, this vector is passed, together with the event, to logging processor 22. From this vector, the logging processor distributes the event to receivers in accordance with the event vector.

Thus, the method of the present invention dynamically selectively distributes the client node events to particular ones of the receivers, in response to commands selectively enabling/disabling the client events to each receiver, while maintaining only the presently needed mapping in the server memory. The commands may be provided before the client node is logged onto the server, or after, and the client event vectors are dynamically updated and the events appropriately distributed.

Figure 11:
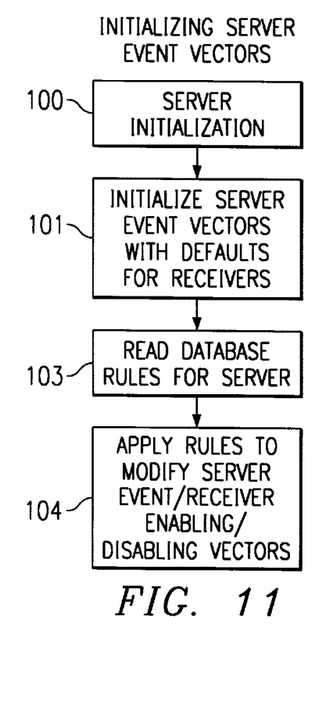
FIG. 11 is a flow chart representing an embodiment of the process of initializing server event vectors employed with the server of FIGS. 1 and 2.
Figure 12:
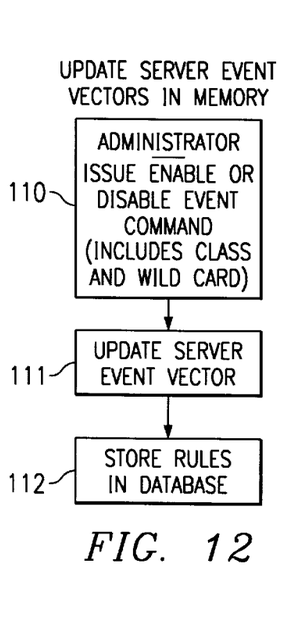
FIG. 12 is a flow chart representing an embodiment of the process of updating server vectors employed with the server of FIGS. 1 and 2.
Figure 13:
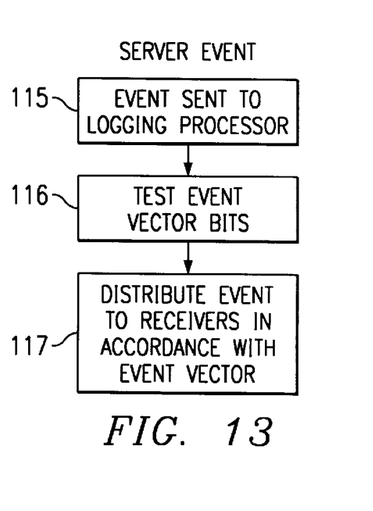
FIG. 13 is a flow chart representing an embodiment of the process of handling a server event employed with the server of FIGS. 1 and 2.

Server vectors not related to any client nodes are discussed with respect to FIGS. 11–13. An embodiment of initializing the server event vectors is illustrated in FIG. 11. Server initialization begins at step 100. In step 101, the server event vectors are initialized with defaults for all events/receivers. The database rules for the server are read in step 103, and, in step 104, the rules are applied to modify the server event bit vectors, such as two dimensional vector 54 shown in FIG. 4.

The server vector may then be dynamically updated as the administrator makes changes to the logging requirements, as illustrated in FIG. 12. In step 110, the administrator issues enable or disable event command, which may be a command for a specific node and event, a class command, or a wild card. In step 111, the server event bit vector is updated in memory 25, and, in step 112, the new command rules are stored in database 24.

A server event is then illustrated in FIG. 13. Upon the occurrence of the event, the event is sent to logging processor 22, and the server vector 54 of FIG. 4 (in shared memory) is accessed by the logging processor in step 115. In step 116, the logging processor tests the appropriate bits. In step 117, the logging processor distributes the event to receivers in accordance with the tested bits.

Again, the vectors are dynamically updated without requiring that the server 10 be stopped and reinitialized.

While the preferred embodiments of the present invention have been illustrated in detail, it should be apparent that modifications and adaptations to those embodiments may occur to one skilled in the art without departing from the scope of the present invention as set forth in the following claims.

We claim:

1. In a server having a plurality of clients coupled to said server at client nodes, said server coupled to a plurality of receivers, wherein event messages may be generated relating to said client nodes, a method for dynamically selectively distributing said client node event messages to particular ones of said receivers, in response to a selective enabling/disabling of client events to each said receiver, comprising the steps of:

upon opening a session of a client node, determining said selectively enabled one to many events mapped to one to many receivers relating to said client node;

dynamically updating said determined selectively enabled one to many events mapped to one to many receivers relating to said client node upon said selective enabling/disabling occurring during said session of said client node; and upon occurrence of an event message relating to a client node, distributing said event message to ones of said receivers having been selectively enabled for said event in said determining and said dynamically updating steps.

2. The method of claim 1, additionally comprising the step of storing vectors for selectively enabling/disabling said one to many events mapped to one to many receivers, wherein said determining step additionally comprises reading said stored vectors for said client node for selectively enabling/disabling said events for said receivers, and wherein said dynamically updating step additionally updates said stored vectors.

3. The method of claim 2, wherein said step of storing vectors additionally comprises storing class vectors for selectively enabling classes of said events to ones of said receivers, and wherein said determining step additionally comprises reading said stored class vectors for selectively enabling/disabling said events for said receivers.

4. The method of claim 1, wherein said determining step comprises establishing client event vectors identifying said enabled/disabled one to many events mapped to one to many receivers relating to said client nodes, and wherein said distributing step comprises building a receiver list bit vector from said client event vectors for each said receiver list bit occurrence, said receiver list bit vector identifying said enabled receivers, and distributing said event message to ones of said receivers identified as enabled for said event by said receiver list bit vector.

5. The method of claim 1, wherein said determining step additionally comprises establishing a client event vector of said selectively enabled one to many events mapped to one to many receivers relating to said client node; wherein said dynamically updating step additionally comprises updating said client event vector; and wherein said distributing step additionally includes referencing said client event vector for said client node, and distributing said event message to ones of said receivers indicated in said client event vector as having been selectively enabled for said event.

6. The method of claim 5, additionally comprising the step of:

storing vectors for selectively enabling/disabling said one to many events mapped to one to many receivers, and, wherein said determining step of establishing said client event vector additionally comprises reading said stored vectors for said client node for selectively enabling/disabling said events for said receivers.

7. The method of claim 6, wherein said dynamically updating step additionally comprises determining whether said session of said client node is open and if so, updating said client event vector.

8. The method of claim 6, wherein said step of storing vectors additionally comprises storing class vectors for selectively enabling classes of said events to ones of said receivers, and wherein said determining step of establishing said client event vector additionally comprises reading said stored class vectors for selectively enabling/disabling said events for said receivers.

9. The method of claim 5, wherein said distributing step additionally comprises building a receiver list bit vector from said client event vectors for each said event occurrence, said receiver list bit vector identifying said enabled receivers, and distributing said receiver list bit to ones of said receivers identified as enabled for said event, by said receiver list bit vector.

10. The method of claim 1, comprising the additional step of collectively enabling/disabling events for groups of said client nodes identified by wild cards to ones of said receivers, and wherein said determining and said updating steps additionally enable/disable said client one to many events mapped to one to many receivers for said connected client nodes in said groups of clients.

11. An article of manufacture comprising a computer readable medium having computer readable program code embodied therein for dynamically selectively distributing client node event messages to particular ones of receivers, in response to a selective enabling/disabling of client events to each said receiver, comprising:

computer readable program code which causes a computer processor to, upon opening a session of a client node, determine said selectively enabled one to many events mapped to one to many receivers relating to said client node;

computer readable program code which causes said computer processor to dynamically update said determined selectively enabled one to many events mapped to one to many receivers relating to said client node upon said selective enabling/disabling occurring during said session of said client node; and computer readable program code which causes said computer processor to, upon occurrence of an event message relating to a client node, distribute said event message to ones of said receivers having been selectively enabled for said event by said determining and said dynamically updating computer readable program code.

12. The article of manufacture of claim 11, additionally comprising computer readable program code which causes said computer processor to store vectors for selectively enabling/disabling said one to many events mapped to one to many receivers, wherein said computer readable program code which causes said computer processor to determine said selectively enabled one to many events mapped to one to many receivers, additionally causes said computer processor to read said stored vectors for said client node for selectively enabling/disabling said events for said receivers, and wherein said computer readable program code which causes said computer processor to dynamically update said determined selectively enabled one to many events mapped to one to many receivers, additionally causes said computer processor to dynamically update said stored vectors.

13. The article of manufacture of claim 12, wherein said computer readable program code which causes said computer processor to store vectors additionally causes said computer processor to store class vectors for selectively enabling classes of said events to ones of said receivers, and wherein said computer readable program code which causes said computer processor to determine said selectively enabled one to many events mapped to one to many receivers, additionally causes said computer processor to read said stored class vectors for selectively enabling/disabling said events for said receivers.

14. The article of manufacture of claim 11, wherein said computer readable program code which causes said computer processor to determine said selectively enabled one to many events mapped to one to many receivers, causes said computer processor to establish client event vectors identifying said enabled/disabled one to many events mapped to one to many receivers relating to said client nodes, and wherein said computer readable program code which causes said computer processor to distribute said event message causes said computer processor to build a receiver list bit vector from said client event vectors for each said event message occurrence, said receiver list bit vector identifying said enabled receivers, and to distribute said event message to ones of said receivers identified as enabled for said event by said receiver list bit vector.

15. The article of manufacture of claim 11, wherein said computer readable program code which causes said computer processor to determine said selectively enabled one to many events mapped to one to many receivers, additionally causes said computer processor to establish a client event vector of said selectively enabled one to many events mapped to one to many receivers relating to said client node; wherein said computer readable program code which causes said computer processor to dynamically update said determined selectively enabled one to many events mapped to one to many receivers, additionally uses said computer processor to update said client event vector; and wherein said computer readable program code which causes said computer processor to distribute said event message additionally causes said computer processor to reference said client event vector for said client node, and to distribute said event message to ones of said receivers indicated in said client event vector as having been selectively enabled for said event.

16. The article of manufacture of claim 15, additionally comprising computer readable program code which causes said computer processor to store vectors for selectively enabling/disabling said one to many events mapped to one to many receivers in a database, and, wherein said computer readable program code which causes said computer processor to establish said client event vector, additionally causes said computer processor to read said stored vectors for said client node for selectively enabling/disabling said events for said receivers.

17. The article of manufacture of claim 16, wherein said computer readable program code which causes said computer processor to dynamically update said determined selectively enabled one to many events mapped to one to many receivers, additionally causes said computer processor to determine whether said session of said client node is open and, if so, to dynamically update said client event vector.

18. The article of manufacture of claim 16, wherein said computer readable program code which causes said computer processor to store vectors additionally causes said computer processor to store class vectors for selectively enabling classes of said events to ones of said receivers, and wherein said computer readable program code which causes said computer processor to determine said selectively enabled one to many events mapped to one to many receivers, establishing said client event vector, additionally causes said computer processor to read said stored class vectors for selectively enabling/disabling said events for said receivers.

19. The article of manufacture of claim 15, wherein said computer readable program code which causes said computer processor to distribute said event message additionally causes said computer processor to build a receiver list bit vector from said client event vectors for each said receiver list bit occurrence, said receiver list bit vector identifying said enabled receivers, and to distribute said event message to ones of said receivers identified as enabled for said event by said receiver list bit vector.

20. The article of manufacture of claim 11, comprising additional computer readable program code which causes said computer processor to collectively enable/disable events for groups of said client nodes identified by wild cards for ones of said receivers, and wherein said computer readable program code which causes said computer processor to determine said selectively enabled one to many events mapped to one to many receivers, and to dynamically update said determined selectively enabled one to many events mapped to one to many receivers, additionally causes said computer processor to additionally enable/disable said client one to many events mapped to one to many receivers for said connected client nodes in said groups of clients.

21. A computer program product usable with a programmable computer having computer readable program code embodied therein for dynamically selectively distributing client node event messages to particular ones of receivers, in response to a selective enabling/disabling of client events to each said receiver, comprising:

computer readable program code which causes a computer processor to, upon opening a session of a client node, determine said selectively enabled one to many events mapped to one to many receivers relating to said client node;

computer readable program code which causes said computer processor to dynamically update said determined selectively enabled one to many events mapped to one to many receivers relating to said client node upon said selective enabling/disabling occurring during said session of said client node; and computer readable program code which causes said computer processor to, upon occurrence of an event message relating to a client node, distribute said event message to ones of said receivers having been selectively enabled for said event by said determining and said dynamically updating computer readable program code.

22. The computer program product of claim 21, additionally comprising computer readable program code which causes said computer processor to store vectors for selectively enabling/disabling said one to many events mapped to one to many receivers, wherein said computer readable program code which causes said computer processor to determine said selectively enabled one to many events mapped to one to many receivers, additionally causes said computer processor to read said stored vectors for said client node for selectively enabling/disabling said events for said receivers, and wherein said computer readable program code which causes said computer processor to dynamically update said determined selectively enabled one to many events mapped to one to many receivers, additionally causes said computer processor to dynamically update said stored vectors.

23. The computer program product of claim 22, wherein said computer readable program code which causes said computer processor to store vectors additionally causes said computer processor to store class vectors for selectively enabling classes of said events to ones of said receivers, and wherein said computer readable program code which causes said computer processor to determine said selectively enabled one to many events mapped to one to many receivers, additionally causes said computer processor to read said stored class vectors for selectively enabling/disabling said events for said receivers.

24. The computer program product of claim 21, wherein said computer readable program code which causes said computer processor to determine said selectively enabled one to many events mapped to one to many receivers, causes said computer processor to establish client event vectors identifying said enabled/disabled one to many events mapped to one to many receivers relating to said client nodes, and wherein said computer readable program code which causes said computer processor to distribute said event message causes said computer processor to build a receiver list bit vector from said client event vectors for each said event message occurrence, said receiver list bit vector identifying said enabled receivers, and to distribute said event message to ones of said receivers identified as enabled for said event by said receiver list bit vector.

25. The computer program product of claim 21, wherein said computer readable program code which causes said computer processor to determine said selectively enabled one to many events mapped to one to many receivers, additionally causes said computer processor to establish a client event vector of said selectively enabled one to many events mapped to one to many receivers relating to said client node; wherein said computer readable program code which causes said computer processor to dynamically update said determined selectively enabled one to many events mapped to one to many receivers, additionally causes said computer processor to update said client event vector; and wherein said computer readable program code which causes said computer processor to distribute said event message additionally causes said computer processor to reference said client event vector for said client node, and to distribute said event message to ones of said receivers indicated in said client event vector as having been selectively enabled for said event.

26. The computer program product of claim 25, additionally comprising computer readable program code which causes said computer processor to store vectors for selectively enabling/disabling said one to many events mapped to one to many receivers in a database, and, wherein said computer readable program code which causes said computer processor to establish said client event vector, additionally causes said computer processor to read said stored vectors for said client node for selectively enabling/disabling said events for said receivers.

27. The computer program product of claim 26, wherein said computer readable program code which causes said computer processor to dynamically update said determined selectively enabled one to many events mapped to one to many receivers, additionally causes said computer processor to determine whether said session of said client node is open and, if so, to dynamically update said client event vector.

28. The computer program product of claim 26, wherein said computer readable program code which causes said computer processor to store vectors additionally causes said computer processor to store class vectors for selectively enabling classes of said events to ones of said receivers, and wherein said computer readable program code which causes said computer processor to determine said selectively enabled one to many events mapped to one to many receivers, establishing said client event vector, additionally causes said computer processor to read said stored class vectors for selectively enabling/disabling said events for said receivers.

29. The computer program product of claim 25, wherein said computer readable program code which causes said computer processor to distribute said event message additionally causes said computer processor to build a receiver list bit vector from said client event vectors for each said receiver list bit occurrence, said receiver list bit vector identifying said enabled receivers, and to distribute said event message to ones of said receivers identified as enabled for said event by said receiver list bit vector.

30. The computer program product of claim 21, comprising additional computer readable program code which causes said computer processor to collectively enable/disable events for groups of said client nodes identified by wild cards for ones of said receivers, and wherein said computer readable program code which causes said computer processor to determine said selectively enabled one to many events mapped to one to many receivers, and to dynamically update said determined selectively enabled one to many events mapped to one to many receivers, additionally causes said computer processor to additionally enable/disable said client one to many events mapped to one to many receivers for said connected client nodes in said groups of clients.

31. A server having a plurality of clients coupled to said server at client nodes, said server coupled to a plurality of receivers, wherein event messages may be generated relating to said client nodes, said server coupled to an input for receiving commands selectively enabling/disabling client events to each said receiver, comprising:

a memory for storing a plurality of vectors for selective enabling/disabling of said client events to each said receiver;

a session processor coupled to said client nodes and to said memory, for detecting opening a session of a client node, and determining from said vectors said selectively enabled one to many events mapped to one to many receivers relating to said client node;

an administrative updating processor coupled to said memory, and coupled to said input and responsive to said receipt of said selective enabling/disabling commands thereat, for dynamically updating said vectors and for dynamically updating any said determined selectively enabled one to many events mapped to one to many receivers relating to said connected client nodes; and a logging processor responsive to an occurrence of an event message relating to a client node, said processor coupled to said session processor and said administrative updating processor, for distributing said event message to ones of said receivers having been selectively enabled for said event by said session processor or said administrative updating processor.

32. The server of claim 31, additionally comprising a client event vector of said selectively enabled one to many events mapped to one to many receivers relating to said client node; wherein said session processor enters said selectively enabled one to many events mapped to one to many receivers for said client node in said client event vector; wherein said administrative updating processor updates said client event vector; and wherein said logging processor references said client event vector for said client node, and distributes said event message to ones of said receivers indicated in said client event vector as having been selectively enabled for said event.

33. The server of claim 31, wherein said input commands and said vectors stored in said memory additionally comprise class vectors for selectively enabling classes of said events to ones of said receivers, wherein said session processor additionally reads said stored class vectors for determining said selectively enabled one to many events mapped to one to many receivers for said client node, and wherein said administrative updating processor dynamically updates, in response to said input commands, said class vectors and any said determined selectively enabled one to many events mapped to one to many receivers for said connected client nodes.

34. The server of claim 31, additionally comprising client event vectors for said client nodes, and wherein said session processor establishes said client event vectors identifying said enabled/disabled one to many events mapped to one to many receivers relating to said client nodes, and wherein said logging processor builds a receiver list bit vector from said client event vectors for each said event occurrence, said receiver list bit vector identifying said enabled receivers, and said logging processor distributes said event to ones of said receivers identified as enabled for said event by said receiver list bit vector.

35. The server of claim 31, wherein said input commands and said vectors stored in said memory additionally comprise wild cards which collectively enable/disable events for groups of said client nodes for ones of said receivers, and wherein said session processor additionally reads said wild cards for determining said selectively enabled one to many events mapped to one to many receivers for said client node, and wherein said administrative updating processor dynamically updates said input wild cards to said memory and updates any said determined selectively enabled events/ receivers for said connected client nodes in said groups of client nodes.

36. In a server having a plurality of clients coupled to said server at client nodes, said server coupled to a plurality of receivers, wherein event messages may be generated relating to said server, a method for dynamically selectively distributing said server event messages to particular ones of said receivers, in response to commands selectively enabling/disabling events to each said receiver, comprising the steps of:

storing class vectors for selectively enabling classes of said events to ones of said receivers;

dynamically updating said stored vectors for said server upon receipt of a said selective enabling/disabling command;

upon occurrence of an event message of said server, determining from said stored vectors, said selectively enabled receivers, for said event; and distributing said event message to ones of said receivers having been selectively enabled for said event in said dynamically updating and said determining steps.

37. The method of claim 36, wherein at least one of said vectors comprises a class vector for selectively enabling classes of said events to ones of said receivers.

38. The method of claim 36, wherein said dynamically updating step comprises dynamically updating said stored vectors for said server in response to a wild card which collectively enables groups of said receivers for ones of said server events.

39. A server having a plurality of clients coupled to said server at client nodes, said server coupled to a plurality of receivers, wherein event messages may be generated relating to said server, said server coupled to an input for receiving commands selectively enabling/disabling events to each said receiver, comprising:

a memory for storing vectors for selective enabling/ disabling of said events to each said receiver;

an administrative updating processor coupled to said memory, and coupled to said input and responsive to said receipt of said selective enabling/disabling commands thereat, for dynamically updating said vectors; and a logging processor responsive to an occurrence of an event message, said processor coupled to said memory, for distributing said event message to ones of said receivers having been selectively enabled for said event by said administrative updating processor.

40. The server of claim 39, wherein at least one of said vectors comprises a class vector for selectively enabling classes of said events to ones of said receivers.

41. The server of claim 39, wherein said administrative updating processor additionally is responsive to a wild card command at said input for updating said vectors, said wild card command collectively enabling groups of said receivers for ones of said server events.

* * * * *